US009043702B2

(12) United States Patent
Kramer et al.

(10) Patent No.: US 9,043,702 B2
(45) Date of Patent: May 26, 2015

(54) METHODS AND SYSTEMS FOR CREATING A SHAPED PLAYLIST

(71) Applicant: United Video Properties, Inc., Santa Clara, CA (US)

(72) Inventors: Jacob Kramer, Cambridge, MA (US); Jim Fingal, Cambridge, MA (US); Alex Helsinger, Somerville, MA (US); Matt Pakulski, Oak Park, IL (US)

(73) Assignee: Rovi Guides, Inc., Santa Clara, CA (US)

( * ) Notice: Subject to any disclaimer, the term of this patent is extended or adjusted under 35 U.S.C. 154(b) by 258 days.

(21) Appl. No.: 13/799,220

(22) Filed: Mar. 13, 2013

(65) Prior Publication Data

US 2014/0281972 A1   Sep. 18, 2014

(51) Int. Cl.
  *G06F 3/00*   (2006.01)
  *G06F 17/30*  (2006.01)
  *G11B 27/00*  (2006.01)
  *H04N 21/00*  (2011.01)

(52) U.S. Cl.
  CPC .......... *G06F 17/30053* (2013.01); *G11B 27/00* (2013.01); *H04N 21/00* (2013.01)

(58) Field of Classification Search
  CPC ................................................ G06F 17/30053
  USPC ................................................ 715/716, 811
  See application file for complete search history.

(56) References Cited

U.S. PATENT DOCUMENTS

| 8,219,536 | B2 * | 7/2012 | Wohlert | 707/694 |
|---|---|---|---|---|
| 2006/0143647 | A1 * | 6/2006 | Bill | 725/10 |
| 2007/0174759 | A1 * | 7/2007 | Ando et al. | 715/500.1 |
| 2009/0172146 | A1 * | 7/2009 | Bates et al. | 709/224 |
| 2009/0199120 | A1 * | 8/2009 | Baxter et al. | 715/765 |
| 2010/0131844 | A1 * | 5/2010 | Wohlert | 715/716 |
| 2010/0131895 | A1 * | 5/2010 | Wohlert | 715/811 |
| 2012/0042245 | A1 * | 2/2012 | Askey et al. | 715/716 |
| 2012/0078684 | A1 * | 3/2012 | Maciocci et al. | 705/7.29 |
| 2012/0117026 | A1 * | 5/2012 | Cassidy | 707/634 |
| 2012/0254755 | A1 * | 10/2012 | Wohlert | 715/716 |
| 2012/0331386 | A1 * | 12/2012 | Hicken et al. | 715/716 |
| 2013/0136417 | A1 * | 5/2013 | Kato | 386/241 |

* cited by examiner

*Primary Examiner* — William Titcomb
(74) *Attorney, Agent, or Firm* — Ropes & Gray LLP

(57) ABSTRACT

Methods and systems are described for generating media playlists, or selecting a media asset, according to a "shape" selected by a user. Specifically, a user may "shape" the playlist by designating specific sub-categories of media assets that should be presented at selected times in the playlist. The media application then interpolates the sub-categories for a media asset between the selected times such that adjacent media assets have smooth categorical transitions (e.g., feature incremental changes in the range of sub-categories).

20 Claims, 9 Drawing Sheets

METHODS AND SYSTEMS FOR CREATING A SHAPED PLAYLIST

BACKGROUND

People commonly access playlists of media content while performing tasks. The media content may appeal to a person's interest or may correspond to a particular task to be performed (e.g., listening to up-beat, motivating music while exercising). These playlists may include media assets in a random order or an order determined by another entity (e.g., music broadcasted over the radio). Alternatively, a person may create his or her own playlist by arranging media assets in a particular order.

While creating a playlist benefits the user as the user is able to select the particular media content he or she wishes to hear, creating a playlist is also time consuming. Furthermore, while the advent of digital music players, mobile computing devices, and other devices capable of presenting audio and video content to users has increased the number of activities that a person can perform while accessing media assets, a user may find that devoting large amounts of time to creating playlists, customized for each activity and situation, is inefficient.

SUMMARY

Accordingly, methods and systems are described herein for quickly and efficiently generating media playlists, or selecting a media asset, according to a "shape" selected by a user. Specifically, a user may "shape" the playlist by designating specific sub-categories of media assets that should be presented at selected times in the playlist. The media application then interpolates the sub-categories for a media asset between the selected times such that adjacent sub-categories (and the media assets associated with those sub-categories) have smooth categorical transitions (e.g., the transition between two sub-categories represents an incremental change in the range of sub-categories).

For example, in response to a user selection of a low tempo media asset at the beginning of the playlist and a high tempo media asset at the end of the playlist, the media application populates a playlist with media assets gradually increasing in tempo. Furthermore, in response to a user selection of a high tempo media asset in the middle of the playlist and low tempo media assets at the beginning and the end of the playlist, the media application generates a playlist that gradually increases in tempo and peaks at the high tempo media asset. The generated playlist then features media assets with gradually decreasing tempos until a low tempo is reached.

In another example, the media application may receive a selection of a category (e.g., media asset release date) associated with the media playlist from a user, wherein the category includes a range of a plurality of sub-categories. The media application may assign a first sub-category (e.g., media assets with a release date in the 1970s) of the plurality of sub-categories to a first time (e.g., zero minute mark), in which a first media asset presented in the media playlist at the first time corresponds to the first sub-category (e.g., is a media asset that was released in 1973). The media application may then assign a second sub-category (e.g., media assets with a release date in the 1990s) of the plurality of sub-categories to a second time (e.g., ten minute mark), in which a second media asset presented in the media playlist at the second time corresponds to the second sub-category (e.g., is a media asset that was released in 1991). The media application then interpolates a third sub-category (e.g., media assets with a release date in the 1980s) of the plurality of sub-categories between the first sub-category and the second sub-category in a period of time between the first time and the second time (e.g., in the period of time after the first media asset is complete but before the ten minute mark). The media application then selects a third media asset to present in the media playlist during the period of time that corresponds to the third sub-category.

In some embodiments, the third category includes a plurality of sub-categories between the first sub-category and the second sub-category in the plurality of sub-categories. For example, if the first sub-category is media assets of artists whose name begins with the letter "A," and the second sub-category is media assets of artists whose name begins with the letter "D," the third sub-category may, itself, include a plurality of sub-categories (e.g., a sub-category of media assets of artists whose name begins with the letter "B" and a sub-category of media assets of artists whose name begins with the letter "C").

In some embodiments, the assignment of the sub-categories of the plurality of sub-categories to the select times is based on a user selection of a media asset to be presented at the selected time. For example, after selecting a category of "tempo," instead of a user indicating to begin a playlist with a low tempo song, the media application may determine that a song selected by the user to play at the beginning of the playlist has a low tempo. Based on that determination, the media application may assign the sub-category of "low tempo" to the selected time.

In some embodiments, the media application generates a graphical interface for display on a display screen, in which the graphical interface charts the category and times in the media playlist. The graphical interface may indicate any assignments of sub-categories by the user or the media application and generate a graphical representation of any interpolated sub-categories. For example, the media application may generate a line graph for the playlist with one axis corresponding to the selected category and one axis corresponding to time. The media application's graphical interface increases the ease of user interactions with the media application as the assignment and manipulation of media asset and sub-categories in the graphical interface are intuitive.

In some embodiments, the media application may use a "shape" to select or recommend a media asset. For example, the media application may receive a selection of a category associated with a play length, in which the category includes a range of a plurality of sub-categories. The media application may assign (e.g., in response to a user selection) a first sub-category of the plurality of sub-categories to a first time in the play length and assign a second sub-category of the plurality of sub-categories to a second time in the play length. The media application may then search for a media asset, to present to a user, having a first characteristic corresponding to the first sub-category and a second characteristic corresponding to the second sub-category, and select the media asset in response to determining that the first characteristic and second characteristic occur at play positions in the media asset corresponding to the first time and the second time, respectively.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF DRAWINGS

Figure 1A:
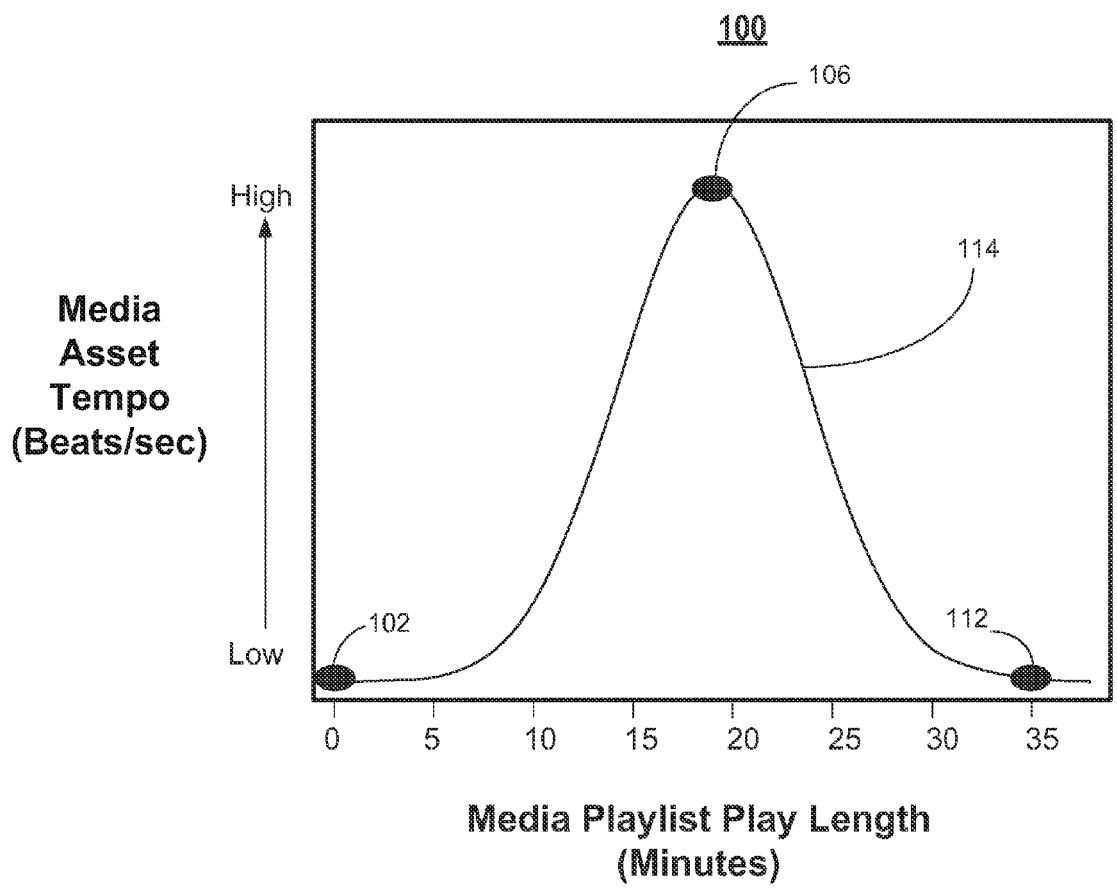
FIG. 1A shows an illustrative example of a shaped playlist generated by a media application based on user selections in accordance with some embodiments of the disclosure.

The amount of content available to users in any given content delivery system can be substantial. Consequently, many users desire a form of media guidance through an interface that allows users to efficiently navigate content selections and easily identify and access content that they may desire. An application that provides such access is referred to herein as a media application.

Methods and systems are described herein for a media application capable of generating shaped media playlists according to one or more categories selected by a user. A user may "shape" the playlist by designating specific sub-categories of media assets that should be presented at selected times in the playlist. The media application then assigns sub-categories to any remaining time by interpolating sub-categories for those times. The interpolated sub-categories are selected such that adjacent sub-categories feature smooth categorical transitions.

As used herein, a "category" refers to any grouping of media assets based on a common characteristic of the media asset. For example, a category of media assets may be based on, but is not limited to, the subject matter of the media asset (e.g., genre, topic, etc.), the type of media asset (e.g., audio, video, image, textual, etc.), presentation qualities of media asset (e.g., the tempo, the volume, the brightness, the color palette, the animation type, etc.), the production qualities of the media asset (e.g., the release date, the author, the producer, the cast and crew, etc.), associations with the media asset (e.g., a mood associated with the media asset, a time period associated with the media asset, other productions associated with the media asset (e.g., films a song was featured in)), playback qualities of the media asset (e.g., formats, codecs, programming languages, compatible devices, etc.), or any other associations or groupings that a user or content provider may define and/or desire.

Each category may include a range of a plurality of sub-categories. As referred to herein, a "sub-category" refers to a division of a category. For example, a category of "action movie" may include sub-categories associated with content ratings associated with each action movie. Furthermore, the range of the plurality of sub-categories refers to the spectrum variations of sub-categories within a category. Each sub-category may also be associated with a sub-category range, which refers to the particular values encompassed by the sub-category.

For example, the range of the plurality of sub-categories for the category of tempo may include all the sub-categories from a sub-category associated with low tempo media assets to a sub-category associated with a high tempo media assets. Furthermore, the sub-category range associated with the sub-category associated with low tempo media assets may include media assets with a tempo between zero beats per minute and twenty beats per minute. In another example, a category may be media asset mood, and the range of sub-categories may extend from somber media assets to exciting media assets, with variations of neutral media assets in between. Furthermore, the sub-category range associated with the sub-category associated with somber media assets may include media assets with a mood rating (e.g., a value assigned by the media application indicative of the mood associated with the media asset) between zero and five. As explained below in relation to FIG. 5, the media application may use numerous methods to analyze and store information describing each media asset in order to categorize each media asset into one or more categories and sub-categories.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Media applications also allow users to navigate among, locate, and access content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

A media application as referred to herein may, in some embodiments, be implemented on a user equipment device. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media assets may be available on these devices, as well. The media assets provided may be for content available only through a television, for content available only through one or more of other types of user equipment devices, or for content available both through a television and one or more of the other types of user equipment devices. The media applications may be provided as on-line applications (i.e., provided on a website), or as stand-alone applications or clients on user equipment devices. Various devices and platforms that may implement media applications are described in more detail below.

FIG. 1A shows an illustrative example of a shaped playlist generated by a media application based on user selections in accordance with some embodiments of the disclosure. Graphical interface 100 is an illustrative representation of a shaped playlist. It should be noted that graphical interface 100 is illustrative only and should not be taken to be limiting in any manner. Graphical interface 100 may appear on a display (e.g., display 200 (FIG. 2)) of a user equipment device.

Graphical interface 100 includes a first and second axis. The first axis defines a category (e.g., a category selected by a user). The category defined in graphical interface 100 is "Media Asset Tempo" (e.g., a category selected by a user). The second axis of graphical interface 100 defines the media playlist play length (e.g., a play length selected by a user). Graphical interface 100 also includes indications 102, 106, and 112. Indication 102, 106, and 112, which correspond to t=0, t=20, and t=35, respectively, indicate that a user has assigned a sub-category to these particular times in the play length of the playlist. It should be noted that in some embodiments, graphical interface may have additional axes (e.g., generating a three dimensional graph). In addition, in some embodiments, each axis may correspond to one or more categories. For example, an axis or category may include both "tempo" and "genre" to generate a playlist featuring Rock songs with varying tempo.

The sub-categories of indications 102, 106, and 112 correspond to the tempo (e.g., as defined by the first axis of graphical interface 100). For example, indications 102 and 112 correspond to a sub-category of "low" tempo, while indication 106 corresponds to a sub-category of "high" tempo. For example, a user may wish to generate a playlist to listen to while exercising. The user may wish to have the playlist present low tempo media assets while the user is warming up and gradually increase the tempo as the intensity of the workout increases (e.g., corresponding to t=0 to t=20). After the peak of the workout (e.g., corresponding to t=20), the tempo of media assets in the playlist gradually decreases as the intensity of workout decreases.

In some embodiments, indications 102, 106, and 112 may represent selections of sub-categories by a user. For example, a user may select a category (e.g., via user input interface 310 (FIG. 3)). A user may then select a low tempo sub-category for time t=0 and a high tempo sub-category for time t=20. The media application may then select a media asset corresponding to the selected sub-category. Alternatively, after selecting a category, a user may select a media asset at time t=0 and another media asset at time t=20. The media application may then determine the particular sub-category of the selected category that the selected media assets correspond to. Based on the determination (e.g., as discussed below in relation to FIG. 6), the media application may assign the determined sub-categories to time t=0 and time t=20, respectively.

Following the assignment of sub-categories to the selected times, the media application may interpolate one or more sub-categories between the selected times. In FIG. 1A, the graphical representation of this interpolation is line 114. It should be noted that the media application may calculate the interpolant (e.g., using any suitable statistical or mathematical operation) of any point on line 114 to minimize the categorical differential necessary between any adjacent sub-categories (or media assets), while meeting the requirements of the user selected sub-categories (or media assets) such that adjacent sub-categories (of media assets) in the playlist have smooth categorical transitions (e.g., the transition between two sub-categories (or two media assets) represents as small an incremental change as possible in the range of sub-categories given the playlist requirements).

For example, the media application may use any suitable interpolation method (e.g., including, but not limited to, piecewise constant interpolation, including, but not limited to, piecewise cubic hermite interpolation and shape-preserving piecewise cubic interpolation, linear interpolation, polynomial interpolation, and/or spline interpolation). In addition, the media application may use Gaussian processes both to determine an interpolant that passes exactly through given data points, but also for fitting a curve through noisy data (e.g., a regression analysis).

For example, the media application may (e.g., via processing circuitry 306 (FIG. 3)) determine an interpolant of two points in graphical interface 100 using linear interpolation. In some embodiments, a linear interpolation may be expressed by equation 1 below:

$$y = y_a + (y_b - y_a)\frac{(x - x_a)}{(x_b - x_a)} \quad \text{(EQ. 1)}$$

In equation 1, y corresponds to a sub-category and x corresponds to a time in the play length of the playlist. Moreover, $x_a$ and $x_b$, correspond to the time associated with the first and second media assets, respectively, and $y_a$ and $y_b$ correspond to the sub-categories associated with the first and second media assets, respectively.

For example, a user may select a category corresponding to average volumes of media assets. Furthermore, the media application may normalize the average volume of all media assets into a scale from zero to eight, in which zero corresponds to media assets with low average volumes and eight corresponds to media assets with high volumes. In this example, a first media asset, with a play length of four minutes and having a low average volume (e.g., corresponding to a first sub-category of zero), is assigned at the zero time mark of the play length of the play list, t=0. A second media asset, having a high average volume (e.g., corresponding to a second sub-category of eight), is assigned at the eight minute time mark of the play list, t=8. Consequently, the media application interpolates a third sub-category, corresponding to an average volume of four, at the four minute mark, t=4, (i.e. representing the end of the play length of the first media asset) using, for example, equation 1.

Figure 1B:
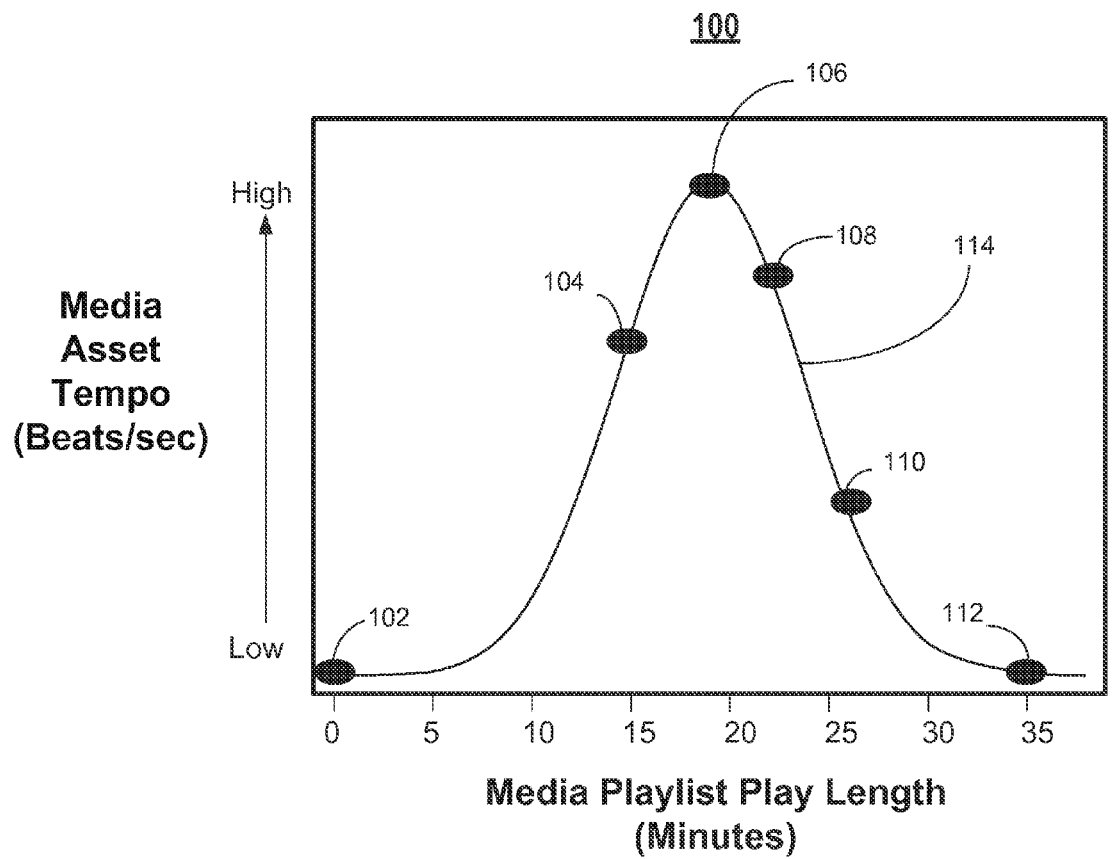
FIG. 1B shows an illustrative example of a media application interpolating additional sub-categories in accordance with some embodiments of the disclosure.

FIG. 1B shows an illustrative example of a media application interpolating additional sub-categories into the graph of FIG. 1A in accordance with some embodiments of the disclosure. In FIG. 1B, the media application has interpolated additional sub-categories into graphical interface 100. For example, line 114 now includes indications 104, 108, and 110. Indication 104 represents a sub-category determined (e.g., via process 600 (FIG. 6)) by the media application as in between the sub-categories associated with indications 102 and 106. Indication 104 is situated at time t=15, which indicates that a media asset corresponding to indication 104 will begin presentation at time t=15 in the playlist.

FIG. 1B represents a completed playlist (i.e. the sum of the play lengths of each media asset in the playlist corresponds to the play length of the playlist). For example, as described below in relation to FIG. 8, after or in conjunction with the assignment of sub-categories, the media application will populate the playlist with media assets corresponding to the assigned sub-categories. For example, indication 104 is positioned by the media application at time t=15, indicating that the media asset associated with indication 102 is presented in the playlist from time t=0 until time t=15. Likewise, indications 108 and 110 are positioned at time t=20 and time t=25, respectively.

Due to the difference in play length of media assets corresponding to each indication (e.g., indication 102, 104, 106, 108, 110, and 112), the position of each indication may vary from its initial position as the playlist is generated. For example, a user may have initially selected the media asset associated with indication 106 to be presented at time=18; however, because there was no media asset (including alternative versions of any media asset) available that met both the sub-category and time requirements (e.g., as discussed below in relation to FIG. 5), the media application modified the position of the initially selected media asset. In some embodiments, the media application may additionally or alternatively crop or extend the play length associated with one or more media assets (or crop or extend the play length of the playlist) in order for the media application to generate the playlist.

As explained above, the difference in the transitions between sub-categories and media assets in the playlist generated by the media application is a result of the time and categorical requirements of the sub-categories and media assets. For example, in FIG. 1B, there are two indications (e.g., indications 108 and 110) between indications 106 and 112, whereas there is only one indication (e.g., indication 104) between indication 102 and indication 106. However, the difference in sub-categories between indication 102 and indication 106 and between indication 106 and indication 112 is the same (e.g., as shown in graphical interface 100). Therefore, the transitions between indications 102, 104, and 106 may not be as smooth (e.g., the incremental changes in sub-categories may be greater) than the transitions between indications 106, 108, 110, and 112 (e.g., the incremental changes in sub-categories may be lesser).

Figure 2:
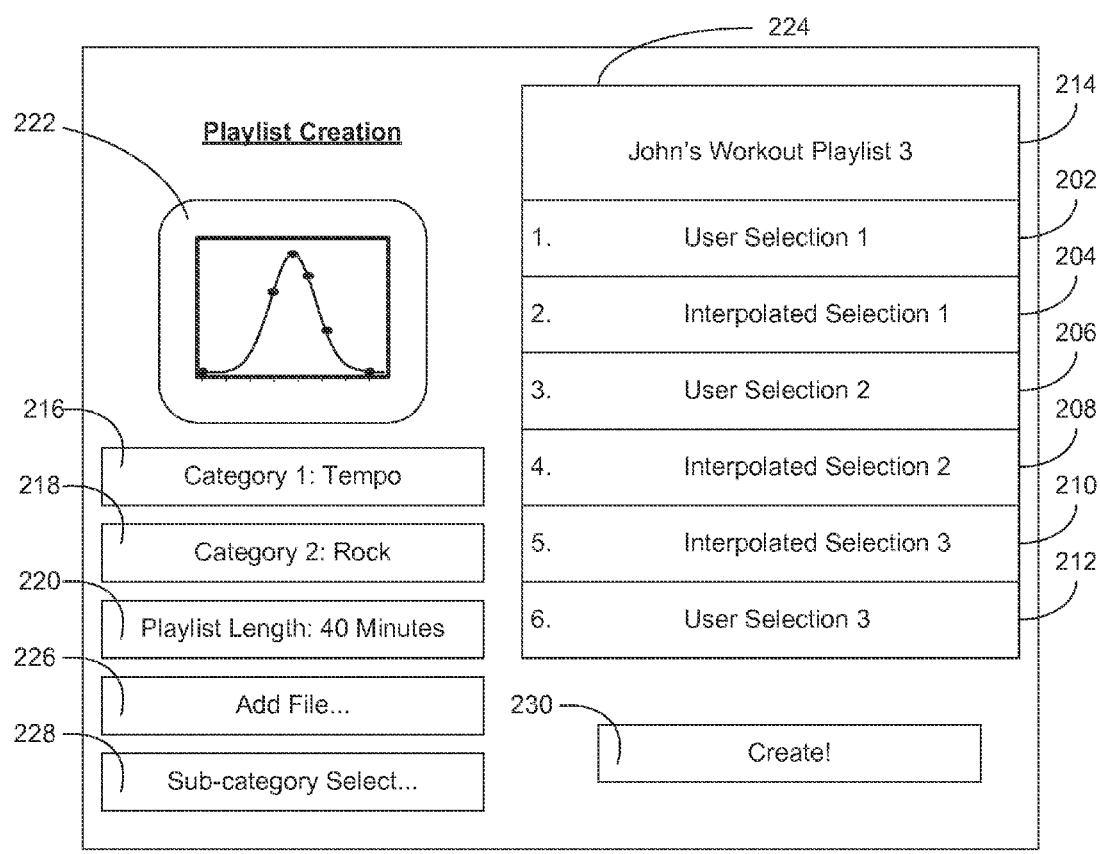
FIG. 2 shows an illustrative example of a media application display used to generate a shaped playlist in accordance with some embodiments of the disclosure.

FIG. 2 shows an illustrative example of a media application display used to generate a shaped playlist. For example, display 200 may represent an interface used by a user to create, transfer, store, retrieve, and/or modify a playlist. Display 200 may appear on one or more user devices (e.g., any of the devices listed in FIGS. 3-4 below). Moreover, the media application may use one or more steps from one or more of the processes described in FIGS. 5-9 below to generated display 200 or any of the features described therein.

FIG. 2 includes display 200. Display 200 may appear on a display device (e.g., user equipment devices 402, 404, and/or 406 (FIG. 4) below). Furthermore, control circuitry 304 as described below in relation to FIG. 3 may be used to generate display 200. Display 200 includes playlist 224. Playlist 224 includes media assets 202, 204, 206, 208, 210, and 212. In some embodiments, media assets 202, 204, 206, 208, 210, and 212 may correspond to indications 102, 104, 106, 108, 110, and 112 (FIG. 1B), respectively. For example, media asset 202, 206, and 212, which represent user selection 1, 2, and 3, respectively, may correspond to indications 102, 106, and 112 (FIG. 1A) that were selected by a user (e.g., using user input interface 310 (FIG. 3)). Media asset 204, 208, and 210, which represent interpolated selection 1, 2, and 3, respectively, may correspond to indications 104, 108, and 110 (FIG. 1B) that were interpolated by the media application.

Playlist 224 also includes title display 214. For example, title display 214 may be used by a user to create, transfer, store, retrieve, and/or modify the playlist or the media assets in the playlist. In some embodiments, the media application may (either automatically or in response to a user input) shape playlists corresponding to various activities or functions. For example, the media application (e.g., via control circuitry 304 (FIG. 3)) may generate a playlist of media assets that are displayed in a slideshow. The user may select a category of "date," and assign media assets having a particular date (e.g., the date an image was captured) to selected times in the slideshow as sub-categories. The media application (e.g., via control circuitry 304 (FIG. 3)) may interpolate the sub-categories between the selected times and populate the sub-categories with images, videos, etc. corresponding to the interpolated subcategories.

The media assets that are included in the playlist may be retrieved from local (e.g., storage 308 (FIG. 3)) or remote (e.g., media content source 416 (FIG. 4)) storage. For example, in some embodiments, media assets may be locally stored on one or more user devices (e.g., user device 402, 404, and/or 406 (FIG. 4)). Additionally or alternatively, media assets may be received from a content provider (e.g., media content source 416 (FIG. 4)) and include/be accompanied by media guidance data.

As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or general information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

In some embodiments, media guidance data may include information related to one or more categories or sub-categories that a media asset, either retrieved from local storage (e.g., storage 308 (FIG. 3)) or received from a content provider (e.g., media content source 416 (FIG. 4)), is associated with.

Display 200 also includes category selection options 216 and 218. In some embodiments, category selection options 216 and 218 may be used to select one or more categories for a playlist. For example, as shown in display 200, the media application may generate a playlist having a category of "Tempo" and "Rock." Display 200 also includes playlist length option 220. Playlist length option may be used by a user to select the play length of a playlist. For example, display 200 currently lists the play length as forty minutes (which may or may not be automatically adjusted based on the time and categorical requirements of sub-categories and media assets in the playlist).

Display 200 also includes graphical interface 222. Graphical interface 222 may, in some embodiments, correspond to graphical interface 100 (FIGS. 1A-B). For example, a user may use graphical interface 222 to shape a playlist. For example, by selecting a category (e.g., via category selection options 216 and 218) and a playlist play length (e.g., via playlist length option 220), the media application may generate graphical interface 222. The media application may then (e.g., via user input interface 310 (FIG. 3)) assign a media asset (e.g., via add file option 226) or a sub-category (e.g., via sub-category select option 228) to a particular time in the graphical interface (e.g., in response to a user input selecting the time in graphical interface 222 and then selecting a media asset or sub-category by selecting add file option 226 of sub-category select option 228).

After the initial media assets and/or sub-categories have been assigned, a user may instruct the media application to interpolate the remaining sub-categories and media assets to populate playlist 224 using the playlist generation icon 230. The media application may then interpolate the remaining sub-categories and media assets to populate playlist 224 (e.g., via control circuitry 304 (FIG. 3)) using one or more steps of process 500 (FIG. 5)).

Figure 3:
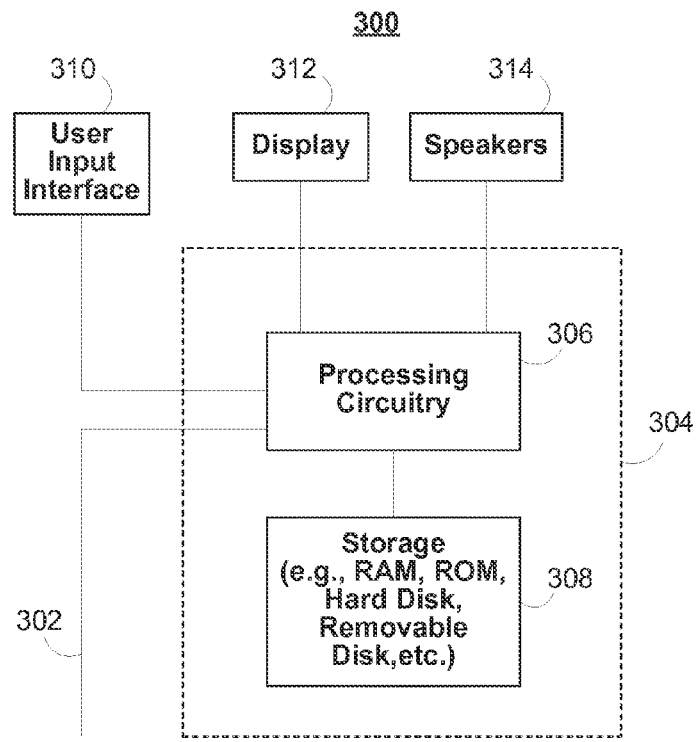
FIG. 3 is a block diagram of an illustrative user equipment device in accordance with some embodiments of the disclosure.

FIG. 3 is a block diagram of an illustrative user equipment device in accordance with some embodiments of the disclosure. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide media assets or content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media application stored in memory (i.e., storage 308). Specifically, control circuitry 304 may be instructed by the media application to perform the functions discussed above and below. For example, the media application may provide instructions to control circuitry 304 to generate the media guidance displays. In some implementations, any action performed by control circuitry 304 may be based on instructions received from the media application.

In client-server based embodiments, control circuitry 304 may include communications circuitry suitable for communicating with a media application server or other networks or servers. The instructions for carrying out the above mentioned functionality may be stored on the media application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and media application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The media application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media application is a client-server based application. Data for use by a thick or thin client implemented on user equipment device 300 is retrieved on-demand by issuing requests to a server remote to the user equipment device 300. In one example of a client-server based media application, control circuitry 304 runs a web browser that interprets web pages provided by a remote server.

In some embodiments, the media application is downloaded and interpreted or otherwise run by an interpreter or virtual machine (run by control circuitry 304). In some embodiments, the media application may be encoded in the ETV Binary Interchange Format (EBIF), received by control circuitry 304 as part of a suitable feed, and interpreted by a user agent running on control circuitry 304. For example, the media application may be an EBIF application. In some embodiments, the media application may be defined by a series of JAVA-based files that are received and run by a local virtual machine or other suitable middleware executed by control circuitry 304. In some of such embodiments (e.g., those employing MPEG-2 or other digital media encoding schemes), the media application may be, for example, encoded and transmitted in an MPEG-2 object carousel with the MPEG audio and video packets of a program.

Figure 4:
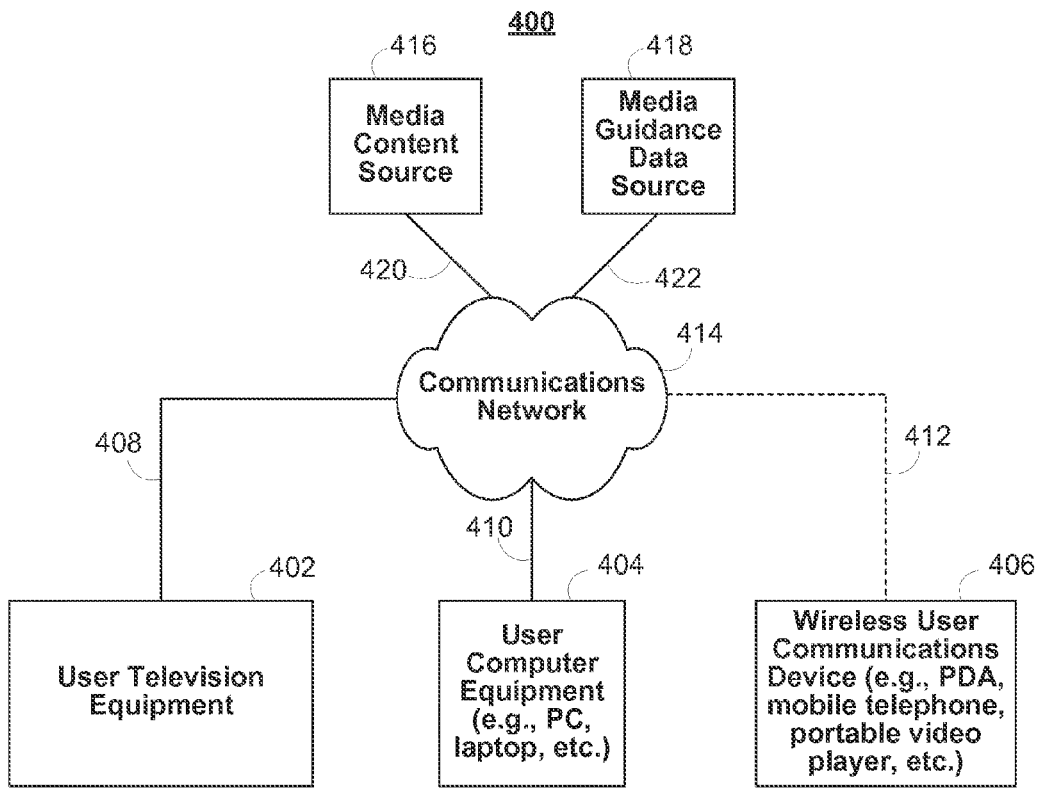
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media application may have the same layout on various different types of user equipment or may be tailored to the display capabilities of the user equipment. For example, on user computer equipment 404, the media application may be provided as a website accessed by a web browser. In another example, the media application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media application settings across in-home devices and remote devices. Settings include those described herein, as well as channel and program favorites, programming preferences that the media application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the media application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing.

In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media application data may be provided to the user equipment devices using any suitable approach. In some embodiments, the media application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a media application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media application itself or software updates for the media application.

Media applications may be, for example, stand-alone applications implemented on user equipment devices. For example, the media application may be implemented as software or a set of executable instructions which may be stored in storage 308, and executed by control circuitry 304 of a user equipment device 300. In some embodiments, media applications may be client-server applications where only a client application resides on the user equipment device, and a server application resides on a remote server. For example, media applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media application may instruct the control circuitry to generate the media application displays and transmit the generated displays to the user equipment devices. The server application may instruct the control circuitry of the media guidance data source 418 to transmit data for storage on the user equipment. The client application may instruct control circuitry of the receiving user equipment to generate the media application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media applications (e.g., web-based applications or cloud-based applications), or the content can be displayed by media applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media application implemented on a remote device. For example, users may access an online media application on a website via a personal computer at their office, or a mobile device such as a PDA or web-enabled mobile telephone. The user may set various settings (e.g., recordings, reminders, or other settings) on the online media application to control the user's in-home equipment. The online guide may control the user's equipment directly, or by communicating with a media application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media application to communicate directly with content source 416 to access content. Specifically, within a home, users of user television equipment 402 and user computer equipment 404 may access the media application to navigate among and locate desirable content. Users may also access the media application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
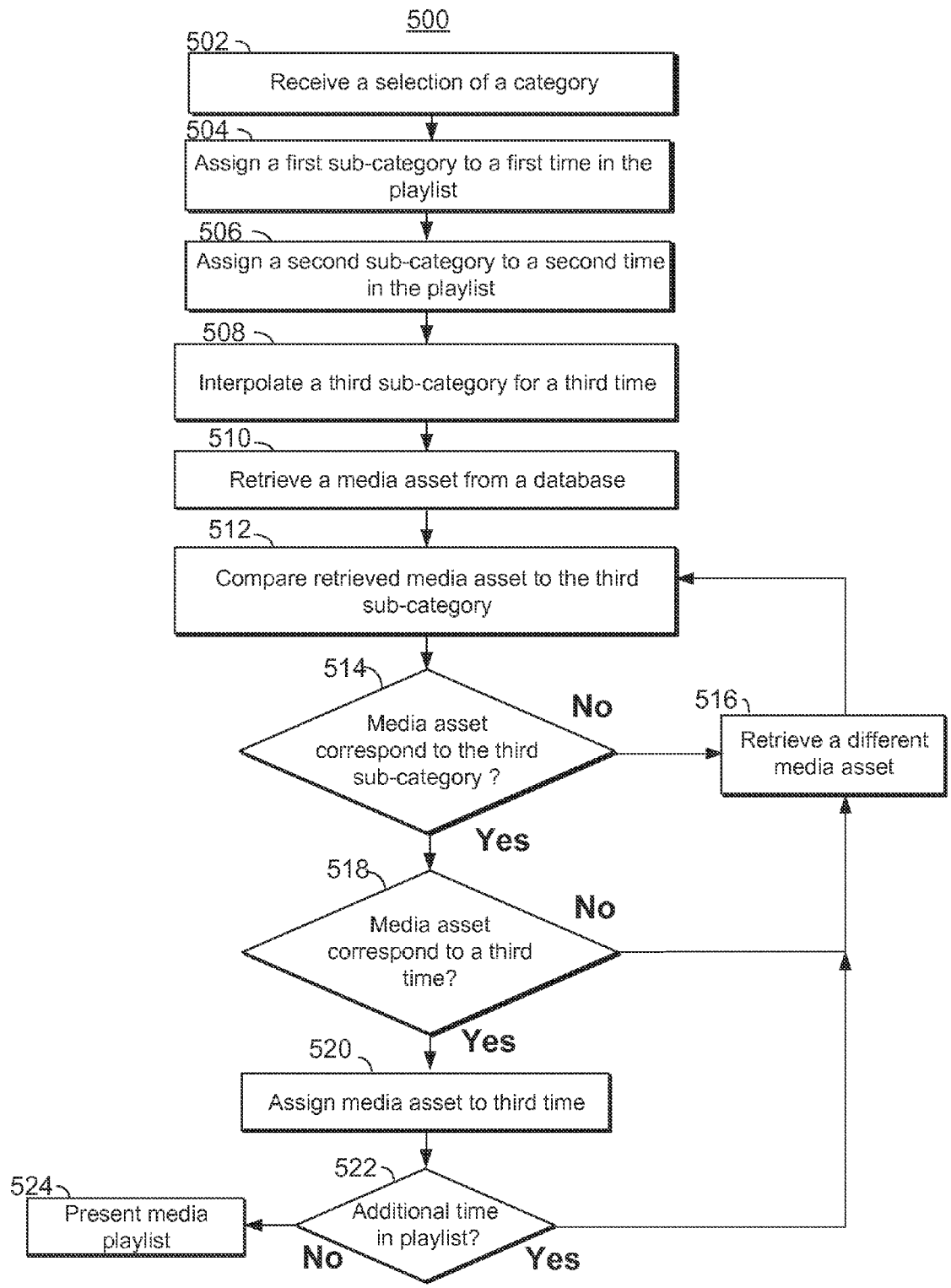
FIG. 5 is a flowchart of illustrative steps for generating a playlist in accordance with some embodiments of the disclosure.

FIG. 5 is a flowchart of illustrative steps for generating a playlist in accordance with some embodiments of the disclosure. Process 500 may be used to generate a media playlist (e.g., playlist 224 (FIG. 2)) on display device (e.g., display 200 (FIG. 2)). It should be noted that process 500 or any step thereof, could occur on, or be provided by, any of the devices shown in FIGS. 3-4. For example, process 500 may be executed by control circuitry 304 (FIG. 3) as instructed by the media application (e.g., implemented on any of the devices shown and described in FIG. 4).

At step 502, the media application receives a selection of a category. For example, the media application may generate a playlist creation screen (e.g., display 200) on the display (e.g., display 312 (FIG. 3)) of a user device (e.g., user equipment device 402, 404, and/or 406 (FIG. 4)). The media application may then receive a user selection (e.g., via user input interface 310 (FIG. 3)) of category selection option 216 (FIG. 2)). In some embodiments, after the selection of one or more categories (e.g., via category selection options 216 and 218 (FIG. 2)) and a playlist play length (e.g., via playlist length option 220 (FIG. 2)), the media application may (e.g., using control circuitry 304 (FIG. 3)) generate a graphical interface (e.g., graphical interface 100 (FIG. 1A-B)).

At step 504, the media application assigns a first sub-category to a first time in the playlist, and at step 506, the media application assigns a second sub-category to a second time in the playlist. In some embodiments, the media application may (e.g., using control circuitry 304 (FIG. 3)) process a user input (e.g., received user input interface 310 (FIG. 3)) to assign a media asset (e.g., via add file option 226) or a sub-category (e.g., via sub-category select option 228) to a particular time in a graphical interface (e.g., graphical interface 100 (FIG. 1A-B)). For example, the media application may generate indications 102, 106, and 112 (FIG. 1) in response to a user input assigning either a media asset or sub-category to the selected times.

In some embodiments, if a media asset is assigned, the media application may determine the particular sub-category of the selected category that the selected media asset corresponds to. Based on the determination, the media application may assign the determined sub-categories to the selected time. For example, the media application may cross-reference an assigned media asset in a database (e.g., located on storage 308 (FIG. 3), media content source 416 (FIG. 4), or media guidance data source 418 (FIG. 4)) to determine a sub-category associated with the media asset. For example, as explained below each media asset may include data that describes characteristics of the media asset, including, but not limited to, the categories, sub-categories, and/or a sub-category ranges associated with the media asset.

Additionally or alternatively, the media application may determine the categories, sub-categories, and/or a sub-category ranges associated with the media asset by analyzing the media asset. For example, the media application may include multiple content-recognition modules to categorized media assets into categories, sub-categories, and/or a sub-category range. For example, the media application may include an object recognition module. The object recognition module may use edge detection, pattern recognition, including, but not limited to, self-learning systems (e.g., neural networks), optical character recognition, on-line character recognition (including but not limited to, dynamic character recognition, real-time character recognition, intelligent character recognition), and/or any other suitable technique or method to determine the objects in and/or characteristics of media assets. For example, the media application may receive a media asset in the form of a video. The video may include a series of frames. For each frame of the video, the media application may use an object recognition module to determine the characteristics associated with each frame (or the media assets as a whole) of the video.

In some embodiments, the content-recognition module or algorithm may also include audio analysis and speech recognition techniques, including but not limited to Hidden Markov Models, dynamic time warping, and/or neural networks (as described above) to translate spoken words into text. The content-recognition module may also use other techniques for processing audio and/or visual data. For example, the media application may monitor the volume or tempo associated with a media asset during the play length of the media asset.

In addition, the media application may use multiple types of optical character recognition and/or fuzzy logic, for example, when comparing multiple data fields (e.g., as contained in the databases described herein). For example, a particular data field cross-referenced by the media application in a database (e.g., located at media guidance data source 418 (FIG. 4)) may be a textual data field. Using fuzzy logic, the system may determine two fields and/or values to be identical even though the substance of the data field or value (e.g., two different spellings) is not identical. In some embodiments, the system may analyze particular data fields of a data structure or media asset frame for particular values or text. The data fields could be associated with characteristics, other data, and/or any other information required for the function of the embodiments described herein. Furthermore, the data fields could contain values (e.g., the data fields could be expressed in binary or any other suitable code or programming language).

At step 508, the media application interpolates a third sub-category for a third time. For example, as discussed below in relation to FIG. 6, the media application determines a third sub-category for the time between the first and second sub-categories in the playlist. For example, as described in FIG. 1B, line 114 includes indication 104 interpolated between indication 102 and 106. Indication 104 represents a sub-category determined by the media application as in between the sub-categories associated with indications 102 and 106.

At step 510, the media application retrieves a media asset from a database. For example, the media application may search a database of available media assets when populating the playlist. In some embodiments, the database may be located on local (e.g., storage 308 (FIG. 3)) or remote (e.g., media content source 416 (FIG. 4) or media guidance data source 418 (FIG. 4)) storage.

At step 512, the media application compares the retrieved media asset to the third sub-category. For example, information associated with the media asset (e.g., metadata) may indicate a sub-category designation (e.g., first sub-category, second category, etc.) or other information that may be used by the media application to determine a sub-category (e.g., the number of beats per minute in the media application) with which the media asset is associated. In some embodiments, the information associated with the media asset may be received or retrieved from local (e.g., storage 308 (FIG. 3)) or remote (e.g., media content source 416 (FIG. 4) or media guidance data source 418 (FIG. 4)) storage separately or in conjunction with the media asset. In some embodiments, the information may be determined through an analysis of the media asset by the media application (e.g., via control circuitry 304 (FIG. 3)) as described above.

At step 514, the media application determines whether or not the media asset corresponds to the third sub-category. For example, the third sub-category may correspond to media assets with a neutral tempo, and the media application determines (e.g., using control circuitry 304 (FIG. 3)) whether or not the retrieved media asset has a neutral tempo. If the media asset does not correspond to the third sub-category, the media application proceeds to step 516 and selects a different media asset (e.g., retrieved from storage 308 (FIG. 3)), which is compared to the third sub-category at step 512. If the media asset does correspond to the third sub-category, the media application proceeds to step 518.

At step 518, the media application determines whether or not the retrieved media asset corresponds to a third time. For example, the media application may require a media asset that has a play length of four minutes (e.g., there is a four minute gap between two previously selected media assets). If the media asset does not correspond to the third time, the media application proceeds to step 516 and selects a different media asset (e.g., retrieved from storage 308 (FIG. 3)), which is compared to the third sub-category at step 512. If the media asset does correspond to the third sub-category, the media application proceeds to step 520 and assigns the retrieved media asset to the playlist (e.g., as interpolated selection 1 204 (FIG. 2)). In some embodiments, the media application may (e.g., using control circuitry 304 (FIG. 3)) crop or extend (e.g., repeat a portion of) a media asset in order to facilitate inclusion of the retrieved media asset in the playlist.

At step 522, the media application determines whether or not there is additional time in the playlist. For example, the media application determines whether or not the sum of the play lengths of each assigned media asset corresponds to the play length (e.g., as determined by playlist length option 220) of the playlist. If there is additional time in the playlist, the media application proceeds to step 516. If there is no additional time in the playlist, the media application proceeds to step 524, and presents the playlist (e.g., playlist 224 (FIG. 2)) to a user (e.g., as display 200 (FIG. 2)) on a display screen (e.g., display 312 (FIG. 3)) of a user device (e.g., user equipment device 402, 404, and/or 406 (FIG. 4)).

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method.

Figure 6:
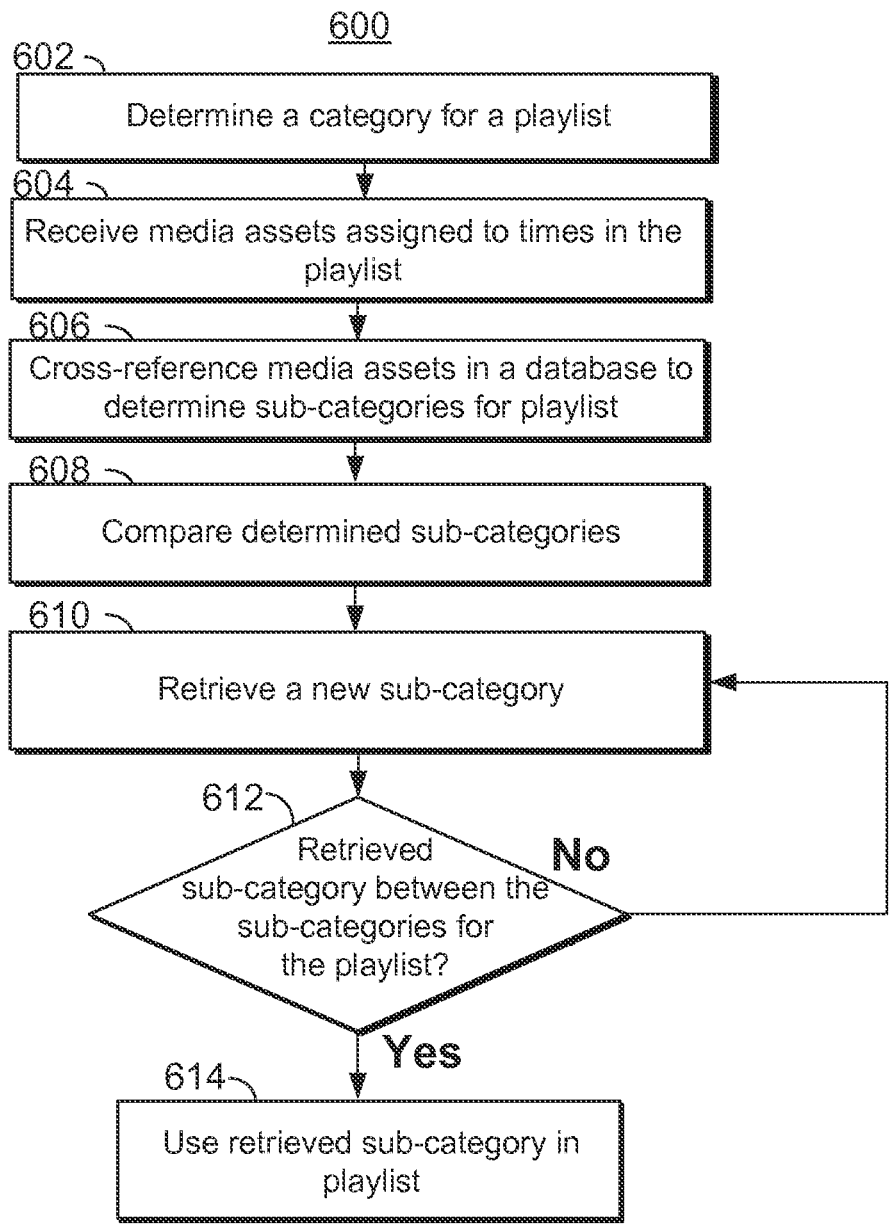
FIG. 6 is a flowchart of illustrative steps for interpolating an additional sub-category in accordance with some embodiments of the disclosure.

FIG. 6 is a flowchart of illustrative steps for interpolating an additional sub-category in accordance with some embodiments of the disclosure. Process 600 may be used to generate a media playlist (e.g., playlist 224 (FIG. 2)) on display device (e.g., display 200 (FIG. 2)). It should be noted that process 600 or any step thereof, could occur on, or be provided by, any of the devices shown in FIGS. 3-4. For example, process 600 may be executed by control circuitry 304 (FIG. 3) as instructed by the media application (e.g., implemented on any of the devices shown and described in FIG. 4).

At step 602, the media guidance application determines a category for a playlist. For example, the media application may generate a playlist creation screen (e.g., display 200) on the display (e.g., display 312 (FIG. 3)) of a user device (e.g., user equipment device 402, 404, and/or 406 (FIG. 4)). The media application may then receive a user selection (e.g., via user input interface 310 (FIG. 3)) of category selection option 216 (FIG. 2)). In some embodiments, after the selection of one or more categories (e.g., via category selection options 216 and 218 (FIG. 2)) and a playlist play length (e.g., via playlist length option 220 (FIG. 2)), the media application may (e.g., using control circuitry 304 (FIG. 3)) generate a graphical interface (e.g., graphical interface 100 (FIG. 1A-B)).

At step 604, the media application receives media assets assigned to times in the playlist. For example, the media application may receive (e.g., via user input interface 310 (FIG. 3)) a selection of a time (e.g., on graphical interface 222 (FIG. 2)) and an assignment of a media asset to the time (e.g., via selection of add file option 226 (FIG. 2)). For example, in response to the selection of add file option 226 (FIG. 2)), the media application may generate a list of available media assets (e.g., stored on a local (e.g., storage 308 (FIG. 3)) or a remote (e.g., media content source 416 (FIG. 4)) database), in which the selection of a media asset assigns the media asset to the selected time. In some embodiments, the media application may generate indications 102, 106, and 112 (FIG. 1) in response to a user input assigning media assets to various selected times.

At step 606, the media application (e.g., via control circuitry 304 (FIG. 3)) cross-references the media assets in a database to determine the sub-categories associated with the playlist.

For example, each sub-category of the selected category may be associated with a particular sub-category range. Each sub-category range may be associated with a range of values. In some embodiments, the category, sub-category, and/or sub-category range information required to interpolate a third sub-category may be retrieved/received from local (e.g., storage 308 (FIG. 3)) or remote (e.g., media content source 416 (FIG. 4) or media guidance data source 418 (FIG. 4)) storage. In some embodiments, the retrieve/received information may be used by the media application (e.g., via control circuitry 304 (FIG. 3)) to identify a sub-category range associated with a sub-category. For example, upon selecting a sub-category, the media application may cross-reference a database (e.g., located at storage 308 (FIG. 3), media content source 416 (FIG. 4), or media guidance data source 418 (FIG. 4)) that lists the sub-category range associated with each sub-category.

For example, a category of "tempo" may include three sub-categories each associated with a sub-category range. The first sub-category range may include media assets with a tempo between zero beats per minute and twenty beats per minute. The second sub-category range may include media assets with a tempo over twenty beats per minute and under one-hundred and twenty beats per minute. The third sub-category range may include media assets with over one-hundred beats per minute.

Alternatively or additionally, in some embodiments, the media application may use the multiple content-recognition modules (as described in relation to FIG. 5) determine characteristics of the media asset (e.g., the tempo) in order to categorized the media asset into categories, sub-categories, and/or a sub-category range.

At step 608, the media application (e.g., via control circuitry 304 (FIG. 3)) compares the first sub-category to the second sub-category. For example, the media application compares the sub-category range associated with a first sub-category (e.g., as indicated by a cross-reference of a database) to the sub-category range associated with the second sub-category (e.g., as indicated by a cross-reference of a database). For example, the media application may determine (e.g., based on information associated with the first sub-category) that the first sub-category (i.e. the sub-category associated with the assigned first media asset) is associated with the first sub-category range of the category. The media application may also determine (e.g., based on information associated with the second sub-category) that the second sub-category (i.e. the sub-category associated with the assigned second media asset) is associated with the third sub-category range of the category.

At step 610, the media application retrieves a new sub-category. For example, the media application may retrieve information, which indicates the number of sub-categories associated with the category and select one of the sub-categories. At step 612, the media application (e.g., via control circuitry 304 (FIG. 3)) determines whether or not the retrieved sub-category is between the previously assigned sub-categories of the playlist. For example, in response to determining that the first sub-category corresponds to the first sub-category range (e.g., via cross-reference with a database as explained above), and the second sub-category corresponds to the third sub-category range (e.g., via cross-reference with a database as explained above), the media application (e.g., via control circuitry 304 (FIG. 3)) interpolates a third sub-category that is between the first sub-category range and the third sub-category range (e.g., the second sub-category range).

If the retrieved sub-category is not between the previously assigned sub-categories of the playlist, the media application returns to step 610 and retrieves a new sub-category. For example, if the retrieved sub-category corresponds to the first sub-category range (i.e. the same sub-category as the sub-category associated with the assigned first media asset), the media application will select a different sub-category. If the retrieved sub-category is between the sub-categories for the media assets (e.g., the retrieved sub-category corresponds to the second sub-category range), the media application proceeds to step 614 and uses the retrieved sub-category. For example, in some embodiments, the retrieved sub-category may correspond to the interpolated third sub-category in step 508 of process 500 (FIG. 5)).

Figure 9:
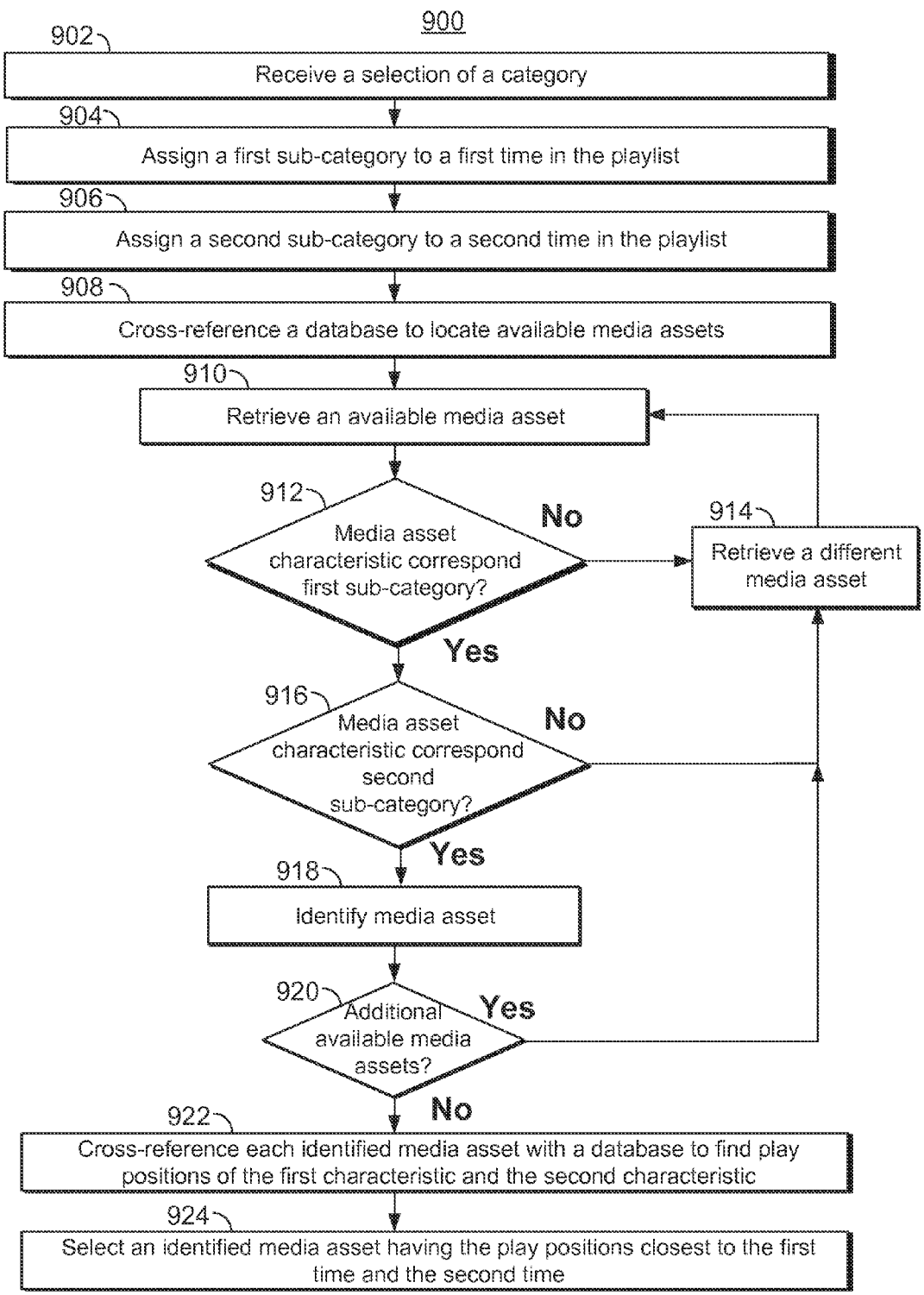
FIG. 9 is a flowchart of illustrative steps for selecting a media asset that corresponds to sub-categories at particular times in accordance with some embodiments of the disclosure.

In some embodiments, the media application may also be used to select a single media asset, which itself includes times during its play length associated with particular assigned sub-categories (e.g., as described in depth in regards to FIG. 9). For example, a user may wish to select a single media asset (e.g., a song) that features distinct sub-categories at different times in the play length of the media asset. For example, while exercising a user may wish to listen to a media asset that coincides with the intensity of his or her workout. Knowing that he or she wishes to begin the workout with a gradual warm-up, which peaks at about two minutes, the media application allows a user to select one or more categories (e.g., "music," "Rock," and "tempo") and assign one or more sub-categories (e.g., "slow tempo" and "fast tempo") such that the media application selects a song of the Rock genre that begins with a slow tempo (e.g., indicative of a low intensity portion or play position) and gradually reaches a fast tempo (e.g., indicative of a high intensity portion or play position) at about two minutes into the play length of the media asset.

To select a media asset featuring the particular categories and sub-categories at the particular times, the media application may receive and/or retrieve information (e.g., from media guidance data source 418 (FIG. 4)) about the media asset describing not only the categories and sub-categories associated with the media asset, but also particular times in the play length of the media asset that are associated with different sub-categories.

For example, each available media asset (e.g., stored in local (e.g., storage 308 (FIG. 3)) or remote (e.g., media content source 416 (FIG. 4) or media guidance data source 418 (FIG. 4)) storage may correspond to information (e.g., a data file) describing the particular times in the play length of the media asset that are associated with different sub-categories. In some embodiments, this information may be received/retrieved from local (e.g., storage 308 (FIG. 3)) or remote (e.g., media content source 416 (FIG. 4) or media guidance data source 418 (FIG. 4)) storage separately or in conjunction with the media asset.

For example, the media application may cross-reference assigned sub-categories at particular times in a playlist (e.g., as received via user input interface 310 (FIG. 3)) to a database including information describing the particular times in the play length of the media asset that are associated with different sub-categories. Based on the cross-reference, the media application may match the assigned sub-categories in the playlist to a media asset that corresponds to the assigned sub-categories at the particular times. The media application may then present the media asset (e.g., in display 200 (FIG. 2)) on the display (e.g., display 312 (FIG. 3)) on a user device (e.g., user device equipment 402, 404, and/or 406 (FIG. 4)).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method.

Figure 7:
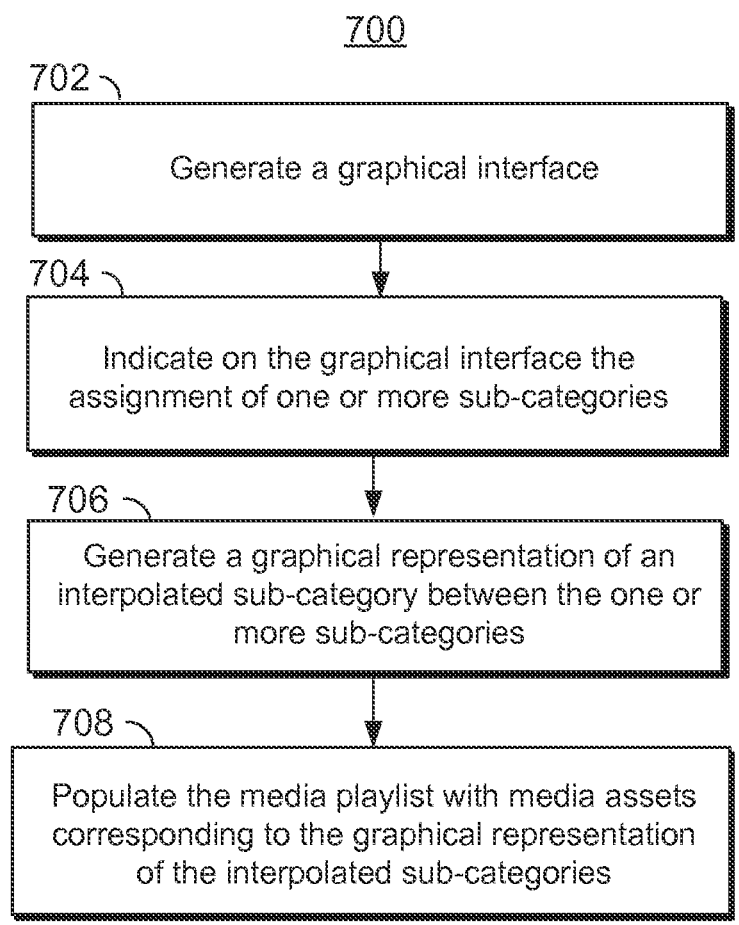
FIG. 7 is a flowchart of illustrative steps for populating a graphical interface with media assets corresponding to the graphical representation of the interpolated sub-categories in accordance with some embodiments of the disclosure.

FIG. 7 is a flowchart of illustrative steps for populating a graphical interface with media assets corresponding to the graphical representation of the interpolated sub-categories in accordance with some embodiments of the disclosure. Process 700 may be used to generate a media playlist (e.g., playlist 224 (FIG. 2)) on display device (e.g., display 200 (FIG. 2)). It should be noted that process 700 or any step thereof, could occur on, or be provided by, any of the devices shown in FIGS. 3-4. For example, process 700 may be executed by control circuitry 304 (FIG. 3) as instructed by the media application (e.g., implemented on any of the devices shown and described in FIG. 4).

At step 702, the media application may generate a graphical interface (e.g., graphical interface 100 (FIGS. 1A-B) or graphical interface 222 (FIG. 2)). For example, the graphical interface (e.g., graphical interface 100 (FIG. 1A-B)) may include a first and second axis. The first axis may define a category (e.g., as selected by a user via category selection option 216 (FIG. 2)). For example, the selected category (e.g., selected by a user via user input interface 310 (FIG. 3)) may be "Media Asset Mood" (e.g., a category selected by a user).

The second axis of graphical interface 100 defines the media playlist play length (e.g., a play length selected by a user).

At step 704, the media application indicates on the graphical interface the assignment of one or more sub-categories. For example, the media application may have received a user selection (e.g., via user input interface 310 (FIG. 3)) of a sub-category assignment (e.g., as described in step 504 (FIG. 5)) to a particular time in the playlist. For example, in response to a user selection of the sub-category "somber" of the category "mood" to the ten minute mark in the playlist, the media application may generate an indication (e.g., indication 102 (FIG. 1A-B)) of the assignment on the graphical interface (e.g., using control circuitry 304 (FIG. 3) to issue instruction to generate the indication on display 312 (FIG. 3)).

At step 706, the media application generates a graphical representation of an interpolated sub-category between the one or more sub-categories. For example, using suitable mathematical operations, the media application calculates a graphical representation of an interpolated sub-category (e.g., line 114 (FIG. 1A)) connecting the indications (e.g., indications 102, 106, and 112 (FIG. 1A)) that minimizes the categorical differential necessary between any adjacent sub-categories to connect all of the indications. In some embodiments, the media application may receive (e.g., via user input interface 310) modifications to the graphical representation of the interpolated sub-category (e.g., line 114 (FIG. 1A)) by a user input dragging or otherwise modifying the slope at any point of the line.

At step 708, the media application populates the playlist with media assets corresponding to the graphical representation of the interpolated sub-categories. For example, by populating the playlist (e.g., as described in relation to FIGS. 5 and 8), according to the graphical representation of the interpolated sub-categories (e.g., a line, arc, parabola, etc.), the media application provides a user with an intuitive display (e.g., graphical interface 222 of display 200 (FIG. 2)) describing the shape of the playlist. The intuitive display allows a user to easily understand, modify, and/or select a given playlist based on the criteria used to generate the playlist.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method.

Figure 8:
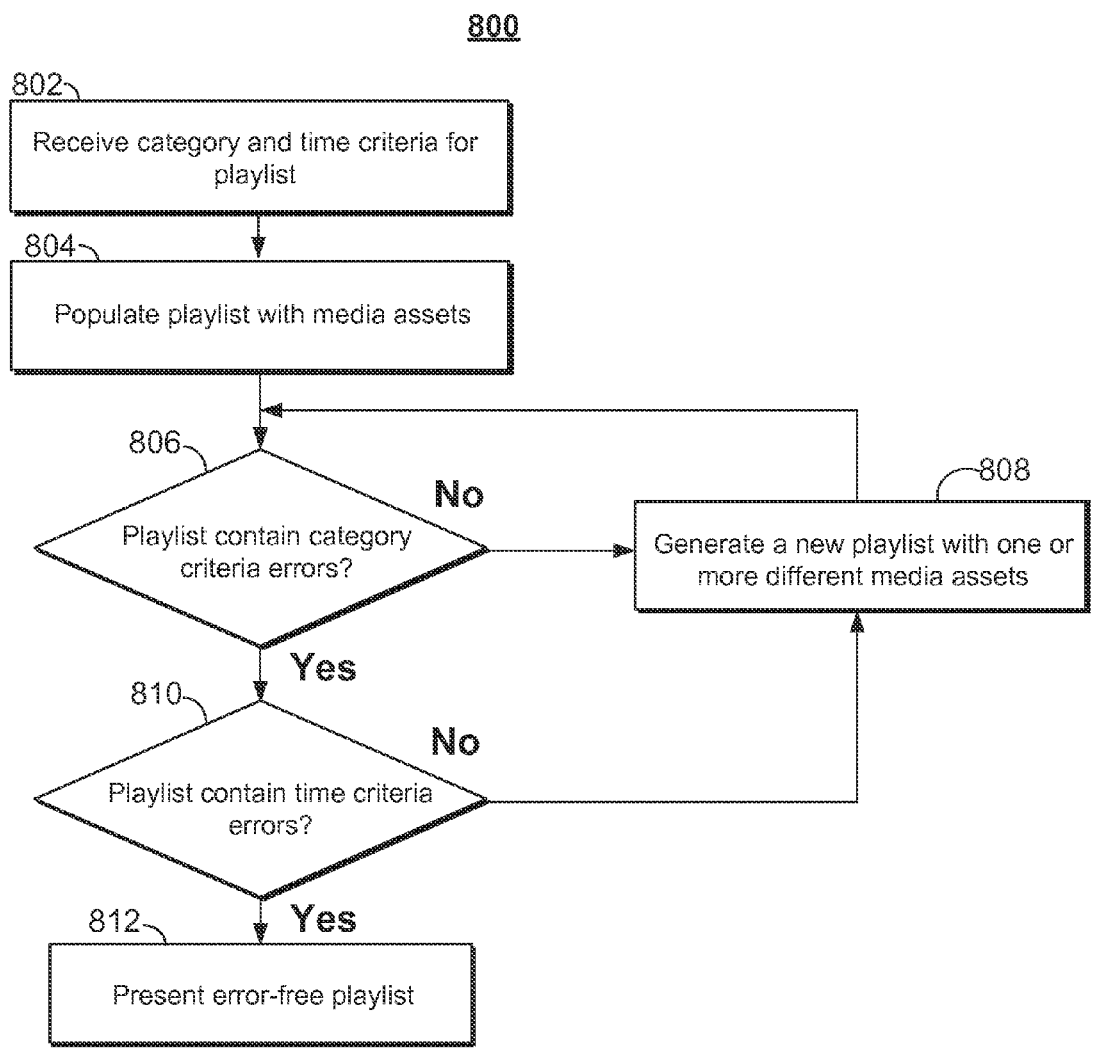
FIG. 8 is a flowchart of illustrative steps for selecting media assets for a playlist in which the playlist is tested for category and time criteria errors in accordance with some embodiments of the disclosure.

FIG. 8 is a flowchart of illustrative steps for selecting media assets for a playlist in which the playlist is tested for category and time criteria errors in accordance with some embodiments of the disclosure. Process 800 may be used to generate a media playlist (e.g., playlist 224 (FIG. 2)) on display device (e.g., display 200 (FIG. 2)). It should be noted that process 800 or any step thereof, could occur on, or be provided by, any of the devices shown in FIGS. 3-4. For example, process 800 may be executed by control circuitry 304 (FIG. 3) as instructed by the media application (e.g., implemented on any of the devices shown and described in FIG. 4).

At step 802, the media application receives category and time criteria (e.g., playlist requirements for a media playlist received via category selection options 216 and 218 (FIG. 2) and playlist length option 220 (FIG. 2)). For example, the media application may incorporate one or more steps of process 500 (FIG. 5) to assign a first sub-category and a second sub-category to a first time and a second time in the playlist, respectively. The media application may also have interpolated (e.g., as described in relation to FIG. 6) one or more sub-categories. Additionally, the media application may also have generated a graphical interface (e.g., graphical interface 100 (FIG. 1A-B)) by incorporating one or more steps of process 700 (FIG. 7)).

At step 804, the media application populates the playlist with media assets (e.g., as discussed in relation to step 708 (FIG. 7)). For example, the media application may generate a playlist (e.g., playlist 224 (FIG. 2)) including a plurality of user selections (e.g., user selection 1 202, user selection 2 206, user selection 3 212 (FIG. 2)) and interpolated selections (e.g., interpolated selection 1 204, interpolated selection 2 208, and interpolated selection 3 210 (FIG. 2)).

At step 806, the media application determines (e.g., via control circuitry 304 (FIG. 3)) whether or not the playlist contains category criteria errors. For example, the media application may process numerous iterations of various processes (e.g., one or more of the steps of the processes associated with FIGS. 5-7) when determining sub-categories and media assets to use to populate a playlist. In some embodiments, successive iterations of such processes may result in category (or sub-category) criteria errors.

For example, a playlist may contain errors if all of the transitions between two sub-categories (or two media assets) in the playlist do not represent as small an incremental change as possible in the range of sub-categories (e.g., as determined via control circuitry 304 (FIG. 3)), or a playlist repeats media assets or plays multiple versions of the same media asset (e.g., as determined via control circuitry 304 (FIG. 3)).

If the playlist does contain category criteria errors, the media application (e.g., via control circuitry 304 (FIG. 3)) generates a new playlist with one or more different media assets at step 808 and returns to step 806. For example, the media application may process another iteration of the various processes (e.g., one or more of the steps of the processes associated with FIGS. 5-7) used to determine the sub-categories and media assets for the playlist, and populate the playlist with different media assets. In some embodiments, the media application may remove the media asset which caused the error from the available media assets (e.g., the media assets available in storage 308 (FIG. 3), media content source 416 (FIG. 4), and/or media guidance data source 418 (FIG. 4)).

If the playlist does not contain category criteria errors, the media application (e.g., via control circuitry 304 (FIG. 3)) proceeds to step 810. At step 810, the media application determines (e.g., via control circuitry 304 (FIG. 3)) whether or not the playlist contains time criteria errors. For example, the media application may process numerous iterations of various processes (e.g., one or more of the steps of the processes associated with FIGS. 5-7) when determining the times associated with sub-categories as well as the times associated with the play length of the media asset and the play length of the playlist. In some embodiments, successive iterations of such processes may result in time criteria errors.

For example, a generated playlist may not meet an acceptable deviation (e.g., as determined via control circuitry 304 (FIG. 3)) from a selected play length (e.g., as received via playlist length option 220 (FIG. 2)); a media asset in the playlist may be excessively cropped or extended in excess of an acceptable amount (e.g., as determined via control circuitry 304 (FIG. 3)); and modifications/adjustments to the assigned times of sub-categories/media assets may not meet an acceptable deviation (e.g., as determined via control circuitry 304 (FIG. 3)) from an assigned time (e.g., as received via graphical interface 222 (FIG. 2)).

If the playlist does not contain time criteria errors, the media application (e.g., via control circuitry 304 (FIG. 3))

proceeds to step 812 and presents an error free playlist (e.g., playlist 224 (FIG. 2)). In some embodiments, the media application may also present (e.g., on display 200 (FIG. 2)) multiple playlist from which a user (e.g., via user input interface 310 (FIG. 3)) may choose from. Furthermore, the media application may also accept manual modifications/adjustments from a user, in which the media application does not determine whether or not the resulting playlist contains category or time criteria errors.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method.

FIG. 9 is a flowchart of illustrative steps for selecting a media asset that corresponds to sub-categories at particular times in accordance with some embodiments of the disclosure. Process 900 may be used to select a media asset (e.g., media asset 202 of playlist 224 (FIG. 2)) on display device (e.g., display 200 (FIG. 2)). It should be noted that process 900 or any step thereof, could occur on, or be provided by, any of the devices shown in FIGS. 3-4. For example, process 900 may be executed by control circuitry 304 (FIG. 3) as instructed by the media application (e.g., implemented on any of the devices shown and described in FIG. 4).

In some embodiments, the media application may also be used to select a single media asset, which itself includes times during its play length associated with particular assigned sub-categories. For example, a user may wish to select a single media asset (e.g., a movie) that features distinct sub-categories at different times in the play length of the media asset. For example, while exercising a user may wish to watch a media asset that coincides with the intensity of his or her workout. Knowing that he or she wishes to begin the workout with a gradual warm-up, which peaks at about twenty minutes, the media application allows a user to select one or more categories (e.g., "video," "action genre," and "volume") and assign one or more sub-categories of the selected one or more categories (e.g., "volume") such that the media application selects a video of the action genre that begins with a low volume (e.g., indicative of a low intensity scene) and gradually reaches a high volume (e.g., indicative of a high intensity scene) at about twenty minutes into the play length of the media asset.

At step 902, the media application receives a selection of a category. For example, a user may select a category of "media asset tempo" (e.g., via category selection option 216 (FIG. 2) on display 200 (FIG. 2)). At steps 904 and 906, the media application assigns (e.g., via control circuitry 304 (FIG. 3)) a first sub-category and a second sub-category, respectively. For example, when the category is "media asset tempo," a user may designate (e.g., by graphical interface 222 (FIG. 2)) on display 200 (FIG. 2)) the first sub-category as corresponding to a slow tempo portion of the media asset, or a first play position of the media asset in which the tempo is currently slow, and the second sub-category corresponding to a fast tempo portion of the media asset, or a second play position of the media asset in which the tempo is currently fast.

At step 908, the media application cross-references a database to locate available media assets. For example, the media application may query a database, for example, located locally (e.g., on storage 308 (FIG. 3)) or remotely (e.g., at media content source 416 (FIG. 4) or media guidance data source 418 (FIG. 4)) to determine the pool of media assets from which a media asset may be selected.

At step 910, the media application retrieves an available media asset. For example, in some embodiments, the media application may perform multiple iterations of process 900, and with each iteration process a different media asset of the available media assets. At step 912, the media application determines whether the media asset has a characteristic that corresponds to the first sub-category. For example, if a category is "media asset mood," and the first sub-category is a "somber mood," the media application may determine whether or not a portion, or play position, of the media asset includes a somber scene. If so, the media application proceeds to step 916. If not, the media application proceeds to step 914 and retrieves a different media asset because the currently retrieved media asset does not have a characteristic corresponding to the first sub-category.

In some embodiments, to determine whether or not the media asset has a particular portion, or play position, the media application may query a database regarding the characteristics of the media asset. For example, each available media asset (e.g., stored in local (e.g., storage 308 (FIG. 3) or remote (e.g., media content source 416 (FIG. 4) or media guidance data source 418 (FIG. 4) storage) may correspond to information (e.g., a data file) describing the particular characteristics of the media asset that are associated with different sub-categories. In some embodiments, this information may be received/retrieved from local (e.g., storage 308 (FIG. 3)) or remote (e.g., media content source 416 (FIG. 4) or media guidance data source 418 (FIG. 4)) storage separately or in conjunction with the media asset. Using this information, the media application may determine whether or not the media asset has a particular portion or play position.

To identify a media asset featuring the particular categories and sub-categories at the particular times assigned in steps 904 and 906, the media application may receive and/or retrieve information (e.g., from media guidance data source 418 (FIG. 4)) about the media asset describing not only the categories and sub-categories associated with the media asset, but also particular times in the play length of the media asset that are associated with different sub-categories.

At step 916, the media application determines whether the media asset has a characteristic that corresponds to the second sub-category. For example, if a category is "media asset mood," and the second sub-category is a "exciting mood," the media application may determine whether or not a portion, or play position, of the media asset includes an exciting scene. If so, the media application proceeds to step 918 and identifies the media asset as corresponding to both the first and second sub-categories. If not, the media application proceeds to step 914 and retrieves a different media asset because the currently retrieved media asset does not have a characteristic corresponding to the second sub-category. Therefore, the currently retrieved media asset does not meet the assigned requirements (e.g., as assigned in steps 904 and 906 above).

At step 920, the media application determines whether or not there are any more available media assets. For example, in some embodiments, the media application may process all of the available media assets before continuing process 900. Alternatively, the media application may process only a portion of the available media asset. For example, the media application may process available media asset until it locates a suitable media asset (e.g., a media asset that corresponds to the requirements assigned in steps 904 and 906 above). If there are more available media assets, the media application proceeds to step 914 and retrieves a different media asset. If there are not more available media assets, the media application proceeds to step 922.

At step 922, the media application cross-references each identified media asset (e.g., the media assets identified in step 918) with a database to find play positions of the first characteristic and the second characteristic. For example, each identified media asset may correspond to information (e.g., a data file) describing the portions or play positions of particular characteristics that occur in the media asset. In some embodiments, this information may be received/retrieved from local (e.g., storage 308 (FIG. 3)) or remote (e.g., media content source 416 (FIG. 4) or media guidance data source 418 (FIG. 4)) storage separately or in conjunction with the media asset. Using this information, the media application may determine where in the media asset the particular portion or play position corresponding to the first and second categories occur. For example, in some embodiments, the database may be structured as a lookup table. The media application may input (e.g., via control circuitry 304 (FIG. 3)) the particular characteristics, and the database may return the times in the play length of the media asset that portions or play positions corresponding to the requested characteristic occur.

At step 924, the media application selects an identified media asset having the play positions closest to the first time and the second time. For example, the media application may rank each of the identified media assets based on the proximity of the first and second characteristics to the first and second time (i.e. the times associated with the assigned first and second sub-categories). Using suitable statistical methods to generate the ranking, the media application selects the identified media asset with the highest ranking (i.e. the media asset in which the proximity of the first and second characteristics that are the closest to the first and second time. The media application may then present the media asset (e.g., in display 200 (FIG. 2)) on the display (e.g., display 312 (FIG. 3)) on a user device (e.g., user device equipment 402, 404, and/or 406 (FIG. 4)).

Additionally or alternatively, the media application may interpolate a third sub-category of the plurality of sub-categories between the first sub-category and the second sub-category in a third time between the first time and the second time. For example, in addition to selecting a media asset based on the assigned first and second sub-categories, the media application may interpolate additional sub-categories (e.g., as explained above in reference to FIGS. 1A-1B) and to determine whether the media asset has a third characteristic corresponding to the third sub-category.

In some embodiments, the media application may use one or more of the steps and/or processes described FIGS. 5-8 to interpolate the third sub-category from a plurality of sub-categories. For example, the media application may (e.g., via control circuitry 304 (FIG. 3)) assign an order to the plurality of sub-categories, in which each sub-category of the plurality of sub-categories corresponds to a number in the order. The media application may compare a third number, associated with the third sub-category, to a first number, associated with the first sub-category, and a second number, associated with the second sub-category. Upon determining that the third number is between the first number and the second number in the order, the media application may (e.g., via control circuitry 304 (FIG. 3)) assign the third category to the third time between the first time and the second time.

In some embodiments, graphical interface 100 (FIG. 1A) may generate a graphical interface for display (e.g., display 200 (FIG. 2)), in which the graphical interface charts the category and the play length of a single media asset. For example, the media application may (e.g., via control circuitry 304 (FIG. 3)) generate a graphical interface (e.g., graphical interface 222 (FIG. 2)) that indicates the assignment of the first sub-category of the plurality of sub-categories to the first time and the assignment of the second sub-category of the plurality of sub-categories to the second time. Additionally or alternatively, the media application may also generate a graphical representation of an interpolation of a third sub-category of the plurality of sub-categories between the first sub-category and the second sub-category in a period of time between the first time and the second time as discussed above.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for generating a media playlist, the method comprising:
   receiving a selection of a category associated with the media playlist from a user, wherein the category includes a range of a plurality of sub-categories;
   assigning a first sub-category of the plurality of sub-categories to a first time, wherein a first media asset presented in the media playlist at the first time corresponds to the first sub-category;
   assigning a second sub-category of the plurality of sub-categories to a second time, wherein a second media asset presented in the media playlist at the second time corresponds to the second sub-category;
   interpolating a third sub-category of the plurality of sub-categories between the first sub-category and the second sub-category in a period of time between the first time and the second time; and
   selecting a third media asset to present in the media playlist during the period of time that corresponds to the third sub-category.

2. The method of claim 1, wherein the third sub-category includes a plurality of sub-categories between the first sub-category and the second sub-category in the plurality of sub-categories.

3. The method of claim 1 further comprising selecting a play length for the media playlist, wherein the play length corresponds to the period between the first time and the second time.

4. The method of claim 1, wherein the assignment of the first sub-category of the plurality of sub-categories to the first time, is based on a user selection of the first media asset to the first time.

5. The method of claim 1, wherein the category is media asset tempo, and wherein the first sub-category corresponds to low-tempo media assets, the second sub-category corresponds to high-tempo media assets, and the third sub-category corresponds to medium-tempo media assets.

6. The method of claim 1, wherein the category is media asset mood, and wherein the first sub-category corresponds to somber media assets, the second sub-category corresponds to exciting media assets, and the third sub-category corresponds to neutral media assets.

7. The method of claim 1, wherein the category is media asset release date, and wherein the first sub-category corresponds to media assets with release dates before a first date, the second sub-category corresponds to media assets with release dates after a second date, and the third sub-category corresponds to media assets with release dates between the first date and the second date.

8. The method of claim 1, further comprising:
generating a graphical interface for display on a display screen, wherein the graphical interface charts the category and times in the media playlist;
indicating, on the graphical interface, the assignment of the first sub-category of the plurality of sub-categories to the first time and the assignment of the second sub-category of the plurality of sub-categories to the second time; and
generating a graphical representation of the interpolation of the third sub-category of the plurality of sub-categories between the first sub-category and the second sub-category in the period of time between the first time and the second time.

9. The method of claim 1, wherein interpolating a third sub-category of the plurality of sub-categories, further comprises:
assigning an order to the plurality of sub-categories, wherein each sub-category of the plurality of sub-categories corresponds to a number in the order;
comparing a third number, associated with the third sub-category, to a first number, associated with the first sub-category, and a second number, associated with the second sub-category; and
in response to determining that the third number is between the first number and the second number in the order, assigning the third category to a third time between the first time and the second time.

10. The method of claim 1, wherein interpolating causes a smooth categorical transition between the first sub-category and the second sub-category in the plurality of sub-categories.

11. A system for generating a media playlist, the system comprising control circuitry configured to:
receive a selection of a category associated with the media playlist from a user, wherein the category includes a range of a plurality of sub-categories;
assign a first sub-category of the plurality of sub-categories to a first time, wherein a first media asset presented in the media playlist at the first time corresponds to the first sub-category;
assign a second sub-category of the plurality of sub-categories to a second time, wherein a second media asset presented in the media playlist at the second time corresponds to the second sub-category;
interpolate a third sub-category of the plurality of sub-categories between the first sub-category and the second sub-category in a period of time between the first time and the second time, and wherein the third sub-category is between the first sub-category and the second sub-category in the plurality of sub-categories; and select a third media asset to present in the media playlist during the period of time that corresponds to the third sub-category.

12. The system of claim 11, wherein the third sub-category includes a plurality of sub-categories between the first sub-category and the second sub-category in the plurality of sub-categories.

13. The system of claim 11, wherein the control circuitry is further configured to select a play length for the media playlist, wherein the play length corresponds to the period between the first time and the second time.

14. The system of claim 11, wherein the assignment of the first sub-category of the plurality of sub-categories to the first time, is based on a user selection of the first media asset to the first time.

15. The system of claim 11, wherein the category is media asset tempo, and wherein the first sub-category corresponds to low-tempo media assets, the second sub-category corresponds to high-tempo media assets, and the third sub-category corresponds to medium-tempo media assets.

16. The system of claim 11, wherein the category is media asset mood, and wherein the first sub-category corresponds to somber media assets, the second sub-category corresponds to exciting media assets, and the third sub-category corresponds to neutral media assets.

17. The system of claim 11, wherein the category is media asset release date, and wherein the first sub-category corresponds to media assets with release dates before a first date, the second sub-category corresponds to media assets with release dates after a second date, and the third sub-category corresponds to media assets with release dates between the first date and the second date.

18. The system of claim 11, wherein the control circuitry is further configured to:
generate a graphical interface for display on a display screen, wherein the graphical interface charts the category and times in the media playlist;
indicate, on the graphical interface, the assignment of the first sub-category of the plurality of sub-categories to the first time and the assignment of the second sub-category of the plurality of sub-categories to the second time; and
generate a graphical representation of the interpolation of the third sub-category of the plurality of sub-categories between the first sub-category and the second sub-category in the period of time between the first time and the second time.

19. The system of claim 11, wherein interpolating a third sub-category of the plurality of sub-categories, further comprises:
assigning an order to the plurality of sub-categories, wherein each sub-category of the plurality of sub-categories corresponds to a number in the order;
comparing a third number, associated with the third sub-category, to a first number, associated with the first sub-category, and a second number, associated with the second sub-category; and
in response to determining that the third number is between the first number and the second number in the order, assigning the third category to a third time between the first time and the second time.

20. The system of claim 11, wherein interpolating causes a smooth categorical transition between the first sub-category and the second sub-category in the plurality of sub-categories.

* * * * *